Oct. 9, 1956  L. J. BERKELEY  2,766,368
CONTINUOUS LONGITUDINAL SEAM WELDING APPARATUS
Filed March 13, 1947  10 Sheets-Sheet 1

Inventor
LAURENCE J. BERKELEY,
By
Attorney.

Oct. 9, 1956        L. J. BERKELEY        2,766,368

CONTINUOUS LONGITUDINAL SEAM WELDING APPARATUS

Filed March 13, 1947        10 Sheets-Sheet 2

Inventor
LAURENCE J. BERKELEY,
By
Attorney.

Oct. 9, 1956  L. J. BERKELEY  2,766,368
CONTINUOUS LONGITUDINAL SEAM WELDING APPARATUS
Filed March 13, 1947  10 Sheets-Sheet 5

Oct. 9, 1956     L. J. BERKELEY     2,766,368
CONTINUOUS LONGITUDINAL SEAM WELDING APPARATUS
Filed March 13, 1947     10 Sheets-Sheet 6

Inventor
Laurence J. Berkeley,
By [signature]
Attorney.

Oct. 9, 1956          L. J. BERKELEY          2,766,368
CONTINUOUS LONGITUDINAL SEAM WELDING APPARATUS
Filed March 13, 1947          10 Sheets-Sheet 8

United States Patent Office 2,766,368
Patented Oct. 9, 1956

2,766,368

CONTINUOUS LONGITUDINAL SEAM WELDING APPARATUS

Laurence J. Berkeley, Danville, Ill.

Application March 13, 1947, Serial No. 734,435

14 Claims. (Cl. 219—60)

My invention relates to apparatus primarily intended for use in the welding of the longitudinal seams of pipe, tubular shells, etc.

Before articles, or work pieces, are introduced into the apparatus for welding the open seams thereof, the articles usually are preformed from flat material by rolling or pressing operations, and ordinarily at the conclusion of such preforming operations neither the configuration of the work piece nor the formed seam thereof is such as to permit a welding means to produce a uniform result.

One object of my invention is to provide apparatus which will successively and automatically feed work pieces in abutting relationship past the welding means where the seam of the work pieces are welded.

Another object of my invention is to provide means for maintaining the to be welded seam of the work piece in alignment with the welding point.

Another object of my invention is to provide means to assure that the edges of the seam of the work piece are maintained in proper welding position at the welding point.

Another object of my invention is to provide means by which any tendency of the work piece to spiral may be compensated for by simple and facilely made adjustments of the apparatus.

Another object of my invention is to provide an apparatus having interchangeable cage assembly means, so that by the substitution of the proper size diameter cage assembly the same apparatus facilely may be adapted to weld the seams of articles of diameters within a wide range, say, from ten inches in diameter to twenty inches in diameter; or a larger form of my improved apparatus may be adapted to weld the seams of articles within a range of, say, from twenty inches in diameter to thirty-six inches in diameter.

My invention includes the various novel features of construction and arrangement hereinafter more definitely specified.

In said drawings.

Referring to Figs. 1 to 5 inclusive; my apparatus includes the rigid reinforced base member 1 provided with an upper plate member 2 on which the U-shaped yoke members 3 and 5 are rigidly mounted, conveniently by a series of cap screws 6 and 7 which extend respectively through the supporting bases of said yoke members 3 and 5 into said base member 1. Said yokes 3 and 5 are rigidly connected at their upper portions by the top frame member 8, which is provided with intermediate reinforcing transverse members 10. Said top frame member 8 is conveniently connected to said yokes 3 and 5 by means of a series of bolts 12.

Figure 4:
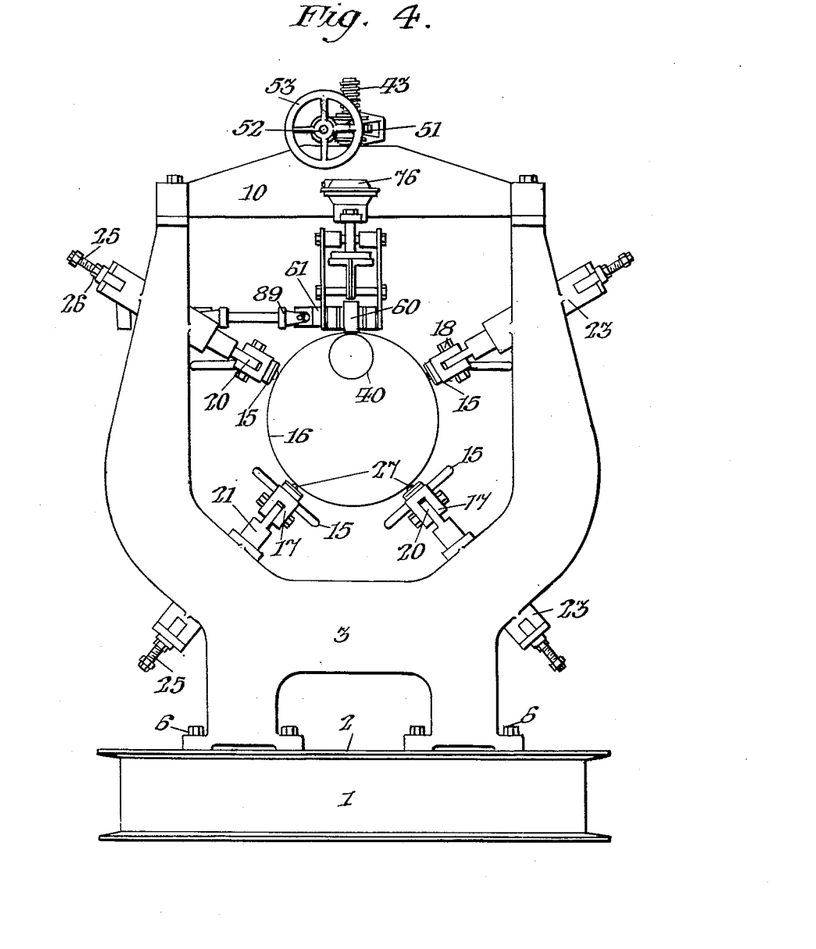
Fig. 4 is a rear elevation of the structure shown in Fig. 1.
Figure 5:
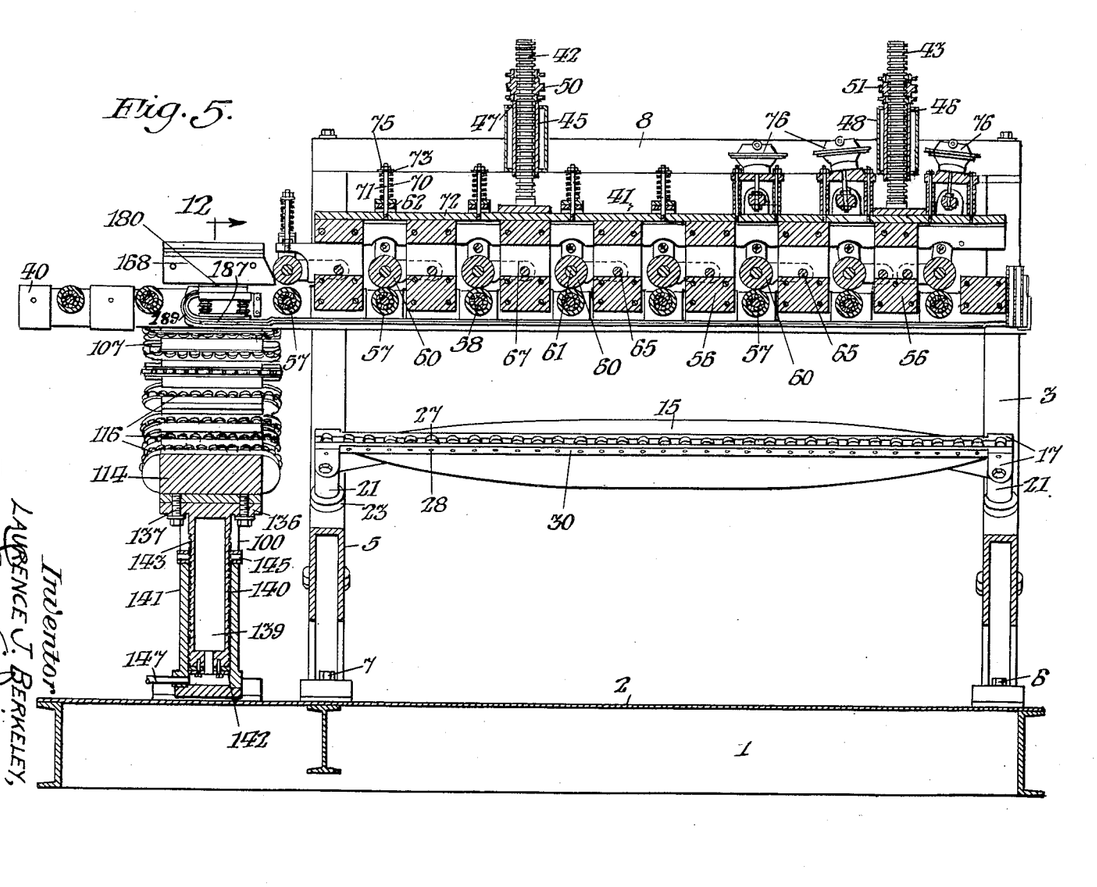
Fig. 5 is a longitudinal vertical sectional view of the structure shown in Figs. 1 to 4 inclusive, taken on the lines 5—5 in Figs. 2 and 3.

As best shown in Figs. 4 and 5; my apparatus is provided with a series of entrance guide and support members 15 adapted to guide and support work pieces, such as preformed tubular shells 16 indicated in Figs. 4 and 6, in their entrance into and passage through the apparatus in the manner hereinafter described. Although I have shown four such support members 15, it is obvious that a greater or lesser number of support members may be used. Said members 15 are provided at their opposite ends with bifurcated lugs 17, and the support members 15 are pivotally mounted, by means of bolts 18, on the flattened eye member ends 20 of their respective support studs 21, with the eye ends 20 positioned within said bifurcations. Said support studs 21 are slidably adjustable in their respective bearing bosses 23 formed as an integral part of the yokes 3 and 5. I find it convenient to provide said support studs 21 with screw means 25 for facilely effecting axial movement of the studs 21 in their bearings 23. Said support studs 21 are adapted to be maintained in predetermined positions of adjustment by means of the lock nuts 26 on the screw means 25. As best shown in Fig. 5, each of the support members 15 is provided with the series of bearing rollers 27 adapted to engage and support the work pieces at their outer surfaces. The bearing rollers 27 are mounted on shafts 28, the opposite ends of which are fixed in the walls of the bearing roller guide channels 30.

Figures 18, 19:
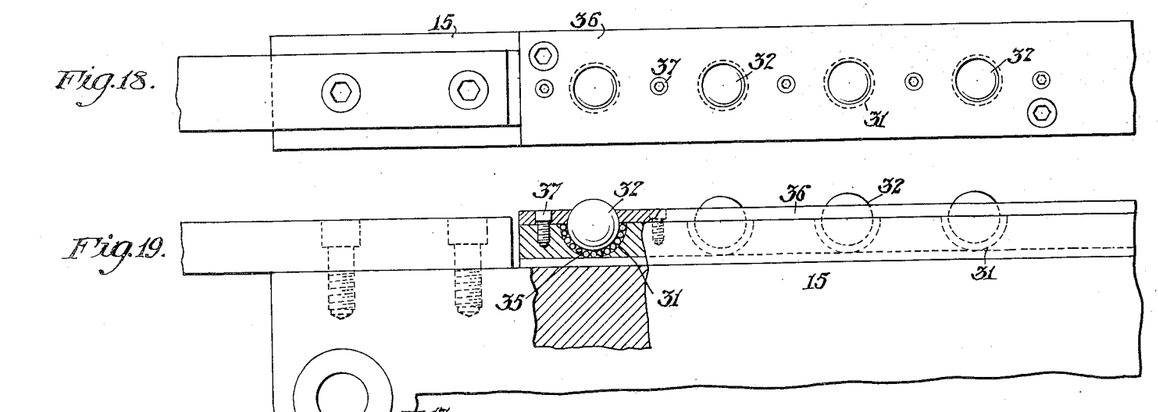
Fig. 18 is a plan view of a modified form of entrance guide assembly.
Fig. 19 is a fragmentary elevation, partly in section, of the structure shown in Fig. 18.

Although in Fig. 5 the support members 15 are shown as provided with a series of bearing rollers; it is obvious that other forms of bearings may be used in lieu of rollers. For example, in Figs. 18 and 19 I have shown the guide members 15 provided with a series of substantially hemispherical recesses, or sockets 31. Bearing balls 32 are mounted in the sockets 31 in a series of small diameter bearing balls 35. Said bearing balls 32 and 35 are retained in position, with freedom of rolling movement in their sockets 31, by means of the retainer plate 36 which is rigidly fastened to the support member 15 by means of a series of socket-head cap screws 37.

As best shown in Figs. 1 to 5 inclusive, the work piece supporting mandrel 40 depends from and is supported by the mandrel support means indicated generally at 41. Said mandrel assembly support means 41 has rigidly connected thereto at its upper surface a pair of hanger shafts 42 and 43 which are provided with screw threaded outer surfaces. Said shafts 42 and 43 are slidably mounted in their respective bearing sleeves 45 and 46 rigidly fixed in openings 47 and 48 formed in the transverse members 10 of the top frame member 8. Said shafts 42 and 43, operatively connected to the mandrel support assembly 41 and mandrel 40, are adapted to be raised and lowered by means of the worm nuts 50 and 51 which are provided with an internal screw thread for engagement with the screw thread formed on the outer surface of said shafts 42 and 43. The peripheries of said nuts 50 and 51 are formed as worm gears and are adapted to be engaged by worms rigidly fixed on the shaft 52. Said shaft 52 is provided at its right-hand end, as in Fig. 1, with the hand wheel 53 for conveniently effecting rotation of the worms in engagement with the worm gears formed on the outer periphery of the nuts 50 and 51. Of course, it is obvious that said shaft 52 may be rotated by a suitable motor drive instead of a hand wheel, as shown. Rotation of the shaft 52 effects simultaneous rotation of the nuts 50 and 51, which effects a raising or lowering of the shafts 42 and 43 simultaneously, and, hence, effects a raising or lowering of the mandrel 40.

Figure 14:
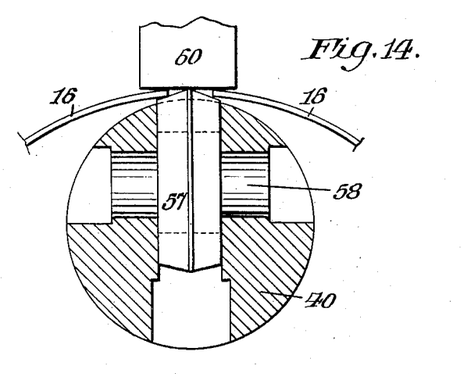
Fig. 14 is a fragmentary transverse vertical sectional view of the mandrel and backup roll of the configuration used at the right-hand end, work piece entrance end, of the apparatus as shown in Fig. 1.
Figure 15:
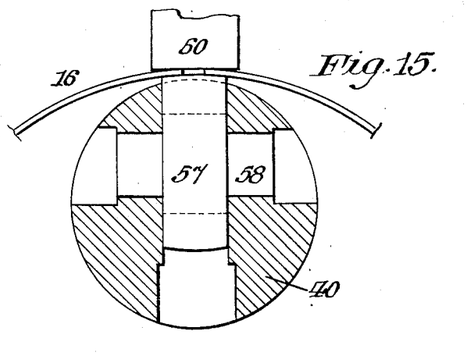
Fig. 15 is a transverse vertical sectional view of the mandrel and backup roll of the configuration used at the intermediate portion of the mandrel.
Figure 16:
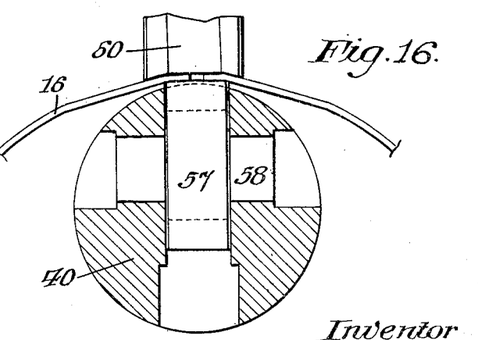
Fig. 16 is a transverse vertical sectional view of the mandrel and backup roll of the configuration used at the left-hand end of the apparatus as shown in Fig. 1.

The mandrel 40 conveniently is formed as a longitudinally split mandrel, the two segments of which are rigidly fixed together by any suitable means. The mandrel 40 is rigidly connected to the mandrel assembly support means by a series of spaced apart fins 56, the upper ends of which are operatively connected to the support means 41, and the lower ends of which are rigidly clamped between the segments of the mandrel 40 by any convenient means. Said fins 56 not only function as the means for supporting the mandrel 40, but also function as a seam guide means to maintain the opposite edges of the longitudinal seams of the preformed tubular shells 16 in proper spaced relation during the passage of the tubular shells through the apparatus to the welding point. As best shown in Figs. 5, and 14 to 16 inclusive; the mandrel 40 is provided with a series of spaced apart backup rolls 57 which are mounted with freedom of turning movement on respective shafts 58, the opposite ends of which are fixed in the segments of the mandrel 40. As indicated in Fig. 5 I find it convenient to mount said rollers 57 on bearing means carried by the shafts 58. As indicated in Figs. 14 to 16, the surfaces of the backup rolls 57 extend a slight distance above the upper surface of the mandrel 40 so as to assure that the tubular shells 16 are supported by and moved on the rolls 57 and not on the surface of the mandrel.

Figure 1:
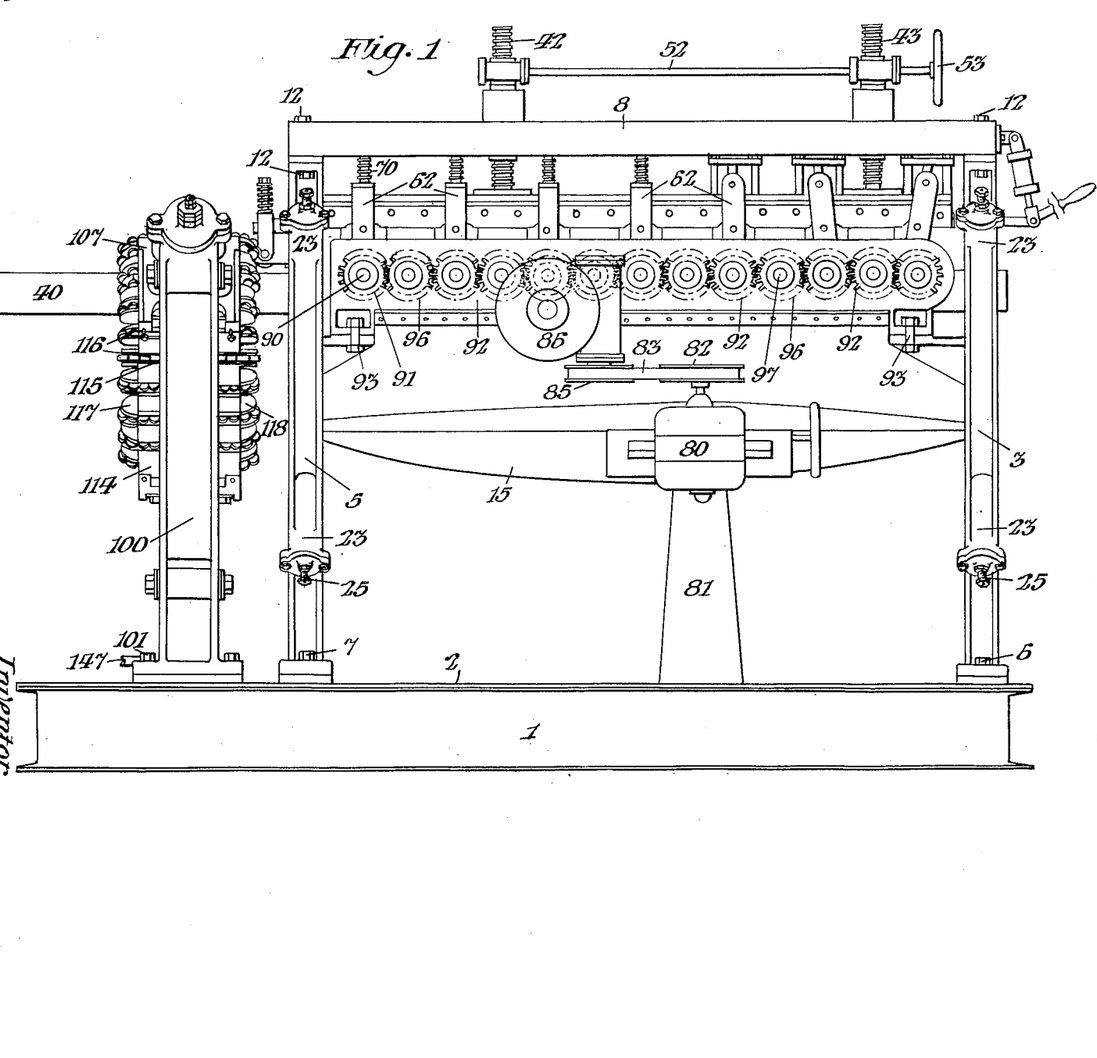
Fig. 1 is a side elevation of an apparatus embodying my invention.
Figure 2:
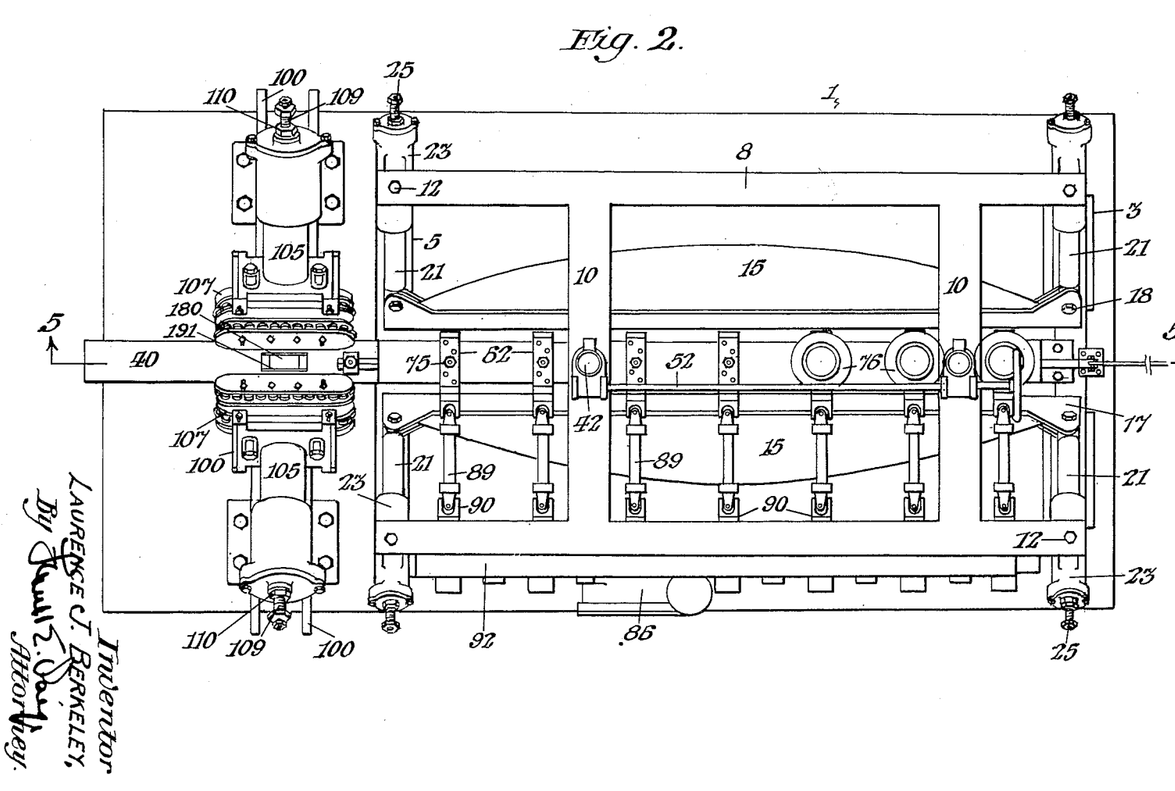
Fig. 2 is a top plan view of the structure shown in Fig. 1.

As best shown in Figs. 1, 2, and 5; the apparatus is provided with a series of knurled-faced drive rolls 60 which are fixedly mounted on shafts 61 which are journalled in the depending arms of the suspension brackets 62. Said shaft 61 and their respective knurled roller 60 and hanger bracket 62 are pivotally connected to support bolts 65 by a pair of spaced pivoted connecting links 67. One end of each link 67 is pivotally mounted on the shank of its bolt 65 as a fixed pivot, and the opposite ends of said links 67 are journalled on the shaft 61 at the opposite sides of the rollers 60. The series of four brackets 62 nearest the welding point of the apparatus, or toward the left in Fig. 5, are U-shaped and said hanger brackets 62 and the knurled rollers 60 carried thereby are stressed downwardly by means of springs 70 which encircle the rods 71. As best shown in Fig. 5, the lower end of the rods 71 are rigidly mounted in the longitudinal plate member 72. The upper cross member of bracket 62 is provided with an opening to enable the bracket 62 to move slidably on the rod 71. The lower end of the spring 70 is in engagement with the upper cross member of the bracket 62, and the upper end of said spring 70 bears against the spring retention plate 73 which is prevented from axial displacement on the shaft 71 by the nut 75. As may be observed from Fig. 5, the springs 70 stress the pivotally mounted knurled drive rolls 60 toward their respective backup rolls 57 carried by the mandrel 40.

I find it convenient to effect the downward stressing of the knurled drive rolls 60 at the entrance end of the apparatus, or to the right in Fig. 5, for example, the first three drive knurled rolls, by means of air cylinders 76 which are operatively connected to the upper cross member of the bracket 62. Said air cylinders may be of any of the well known constructions, and, of course, are connected to a suitable source of supply of air under pressure. Air cylinders are utilized at the entrance end of the apparatus so as to enable the knurled drive rollers 60 operatively connected thereto to effect, if necessary, a greater gripping action on the tubular shells 16 during their initial travel through the apparatus. The edges of the open seams of the preformed shells frequently are considerably distorted and additional pressure may be needed initially to force such seam edges into proper position against the backup rollers 57 carried by the mandrel 40.

The means for driving the knurled rolls 60 includes the motor 80 which conveniently is mounted on a support pedestal 81 rigidly connected to the upper plate member 2 of the base member 1. Of course, the motor may be mounted in any other convenient manner. A drive pulley 82 is mounted on the upper end of the vertically positioned armature shaft of the motor 80, and said pulley 82 is connected by a belt 83 with the drive pulley 85 of the reduction gearing assembly generally indicated at 86. Said reduction gearing may be of any of the constructions well known in the art.

As best indicated in Fig. 2, the outer ends of each shaft 61, on which a knurled roller 60 is fixedly mounted, is operatively connected by a universal coupling drive member 89 to a shaft 90 on which a drive gear 91 is fixedly mounted. Said shafts 90 are journalled in suitable bearings formed in the longitudinal frame member 92, the opposite ends of which are supported by the yoke members 3 and 5, and said member 92 is rigidly connected to said yoke members 3 and 5 conveniently by bolts 93. Said gears 91 are connected by idler gears 96 which are journalled on shafts 97, the opposite ends of which are mounted in bosses formed at the opposite sides of the longitudinal frame member 92. Said reduction gearing 86 is operatively connected in the well known manner to the train of gears 91 and 96.

I find it convenient to rotate one or more of the knurled drive rollers 60 positioned at the entrance end of the apparatus at a greater R. P. M. than the remaining knurled rollers to assure that the work pieces will be maintained in abutting relationship during their travel through the apparatus and past the welding means thereof at the point of welding.

I find it desirable to provide, say, the first three backup rolls 57 at the entrance end of the apparatus with an angular face of the configuration indicated in Fig. 14 to assure that the preformed shell 16 will be gripped tightly between the driven knurled roller 60 and such backup roll 57. Experience has shown that some of the shells as preformed by rolling or pressing operations have a wider than desired seam, or have the opposite edges of the seam spaced apart axially. The use at the entrance end of the apparatus of backup rolls of the configuration indicated in Fig. 14 assures that both of the opposite edges of the shell 16 will be gripped between said opposed rolls, and also assures that a seam edge will not bear against the surface of the mandrel supporting fins 56 in a manner which would create excessive friction as the shell 16 is moved along the mandrel by the drive knurled rolls 60. I have found that the forming of the rolls indicated in Fig. 14 with angular faces of approximately 13° is satisfactory.

I have found it desirable to form, say, the next two backup rolls 57 with crown faces, as is indicated in Fig. 15; and I also have found it desirable to form the two remaining backup rolls positioned closest to the point of welding with a flat face, as is indicated in Fig. 16. I also have found it convenient to form one of the knurled drive rolls which oppose a backup roll with a double angular-edged face, as is indicated in Fig. 16, for preforming, or "cold working," the longitudinal edges of the work piece to eliminate irregularities which may be present in the longitudinal seam, and to assure that the abutting edges of the seam will be positioned in the same plane at the point of welding. By maintaining the abutting edges of the longitudinal seam in the same plane at the point of welding, there is eliminated the possibility of a deflection outwardly or inwardly of the longitudinal seam edges which would relieve the closing pressure. Although conveniently I have shown one of the knurled drive rolls 60 as being provided with such a double angular-edged face for the purposes described above, it is obvious that such double angular-edged face roll for cold working the edge of the longitudinal seam need not necessarily also function as a drive roll.

Referring to Figs. 1, 2, 3, and 5 to 11 inclusive; the cage assembly supporting yoke 100 is U-shaped and is rigidly mounted on the upper plate member 2 of the base member 1 by means of a series of cap screws 101. The upper ends of the arms of the yoke 100 are provided with openings therethrough which form bearings in which the stud shafts 105 are slidably and adjustably mounted. Each of said stud shafts 105 is provided at its inner end with a supporting bracket 106 in which a segment 107 of the upper part of the cage assembly is rigidly mounted, as hereinafter described. Said stud shafts are provided with adjusting screw members 109 by which said stud shafts 105 may be moved facilely inwardly or outwardly in their bearing supports. Said stud shafts 105 are adapted to be retained in adjusted position by means of lock nuts 110 on the screw means 109.

Each of said upper segments 107 is provided with a flat base portion 112 for mounting the segment 107 on its supporting bracket 106. Said brackets 106 are provided with a series of set screws 113 for maintaining said cage segment 107 in adjusted position on its supporting bracket 106.

Each of said upper cage segment 107 and the lower segment 114 of the cage assembly is provided with a series of roller guideways 115 formed as recesses in said segments 107 and 114. Said guideways 115 form track means for the series of bearing roller chains 116 of the cage assembly. The guideways 115 are completed, so as to form a continuous path for the bearing roller chain 116, conveniently by end pieces 117 and 118 fastened to each end of the roller guideways 115 formed in the upper segments 107 and lower segment 114 of the cage assembly. Said end pieces 117 and 118 are fastened to the body of the segments 107 and 114 by means of dowel pins 120.

Each of said roller chains 116 is a continuous chain comprised of a series of roller bearings 121 carried on respective shafts 122, the opposite ends of which are mounted in the side links 123 pivotally connected, at the opposite sides of the bearing rollers, to adjacent shafts 122.

Figure 8:
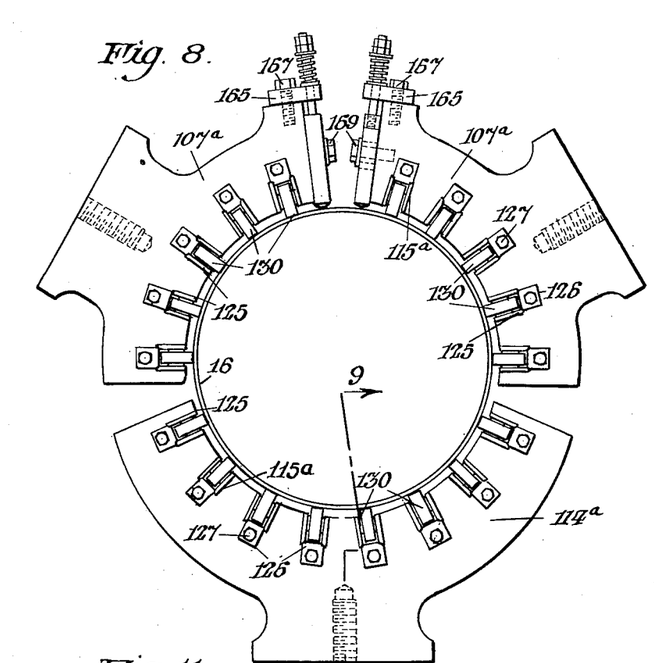
Fig. 8 is a modified form of cage assembly.
Figure 9:
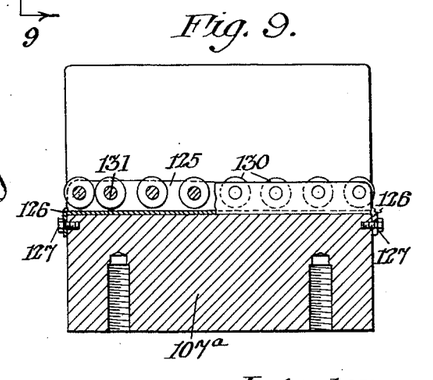
Fig. 9 is a sectional view taken on the line 9—9 in Fig. 8, but with only one of the cage roller elements shown for purposes of clarity.

Although in Figs. 1, 2, 3, 5, 6, and 7, I have shown said upper segments 107 and lower segment 114 of the cage assembly provided with a series of continuous roller chains, it is obvious that said segments may be provided with other forms of bearing means. For example, in Figs. 8 and 9, I have shown a modified cage assembly comprising a series of upper segments 107ª and a lower segment 114ª which are provided with a series of channels 115ª at their inner faces. Said channels 115ª are similar in formation to the upper portion of the form of guideway 115 indicated in Fig. 7. Each of said channels 115ª is provided with the U-shaped stationary frame member 125 positioned in its channel 115ª, as shown in Figs. 8 and 9. Said frame members 125 are retained in position in the channels 115ª by brackets 126 adapted to engage the bottom wall of the frame member 125 in clamped relationship thereto. Said clamp brackets 126 are rigidly connected to the segments 107ª and 114ª by means of cap screws 127 which extend through said clamp brackets 126 into engagement in screw threaded openings formed in the segments 107ª and 114ª. Thus the frame members 125 may be readily rigidly assembled in their respective channels 115ª.

Each of said frame members 125 is provided with a series of bearing rollers 130 which are carried by shafts 131, the opposite ends of which are mounted in the opposite side walls of said U-shaped frame members 125. Said segments 107ª are mounted in their respective brackets 106 in the manner hereinbefore described with reference to said segments 107, and the lower segment 114ª is mounted in the same manner as hereinafter described for the segment 114. For purposes of clarity in Fig. 9, I have shown only the roller assembly nearest to the plane of section, and said roller assembly has been shown partly in section and partly in elevation for purposes of better illustrating the construction.

Figure 3:
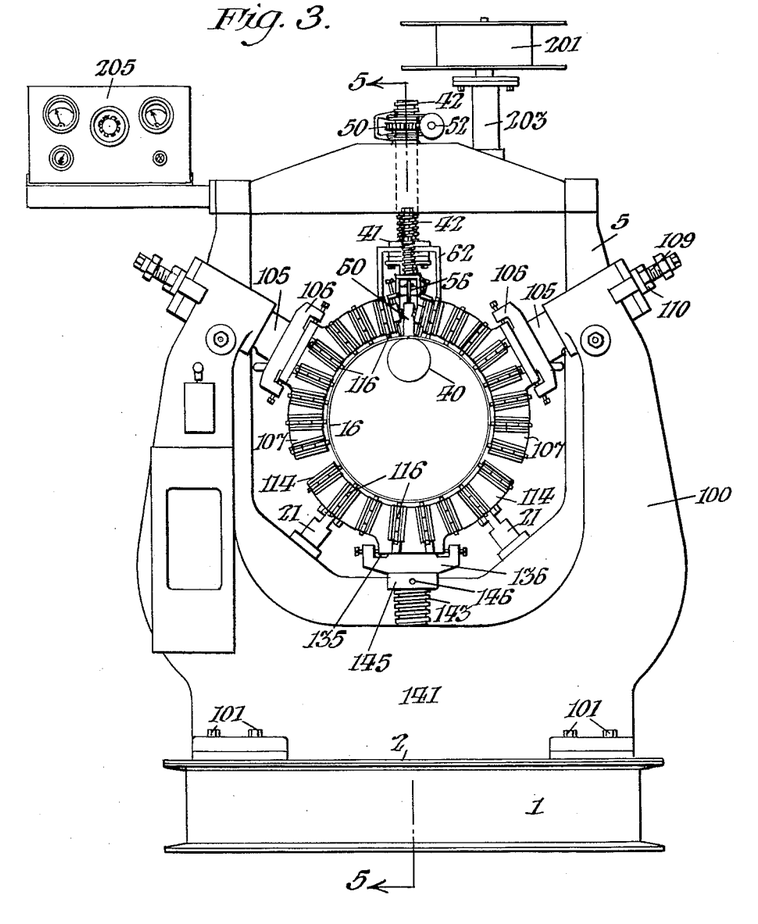
Fig. 3 is a front elevation of the structure shown in Fig. 1.
Figure 6:
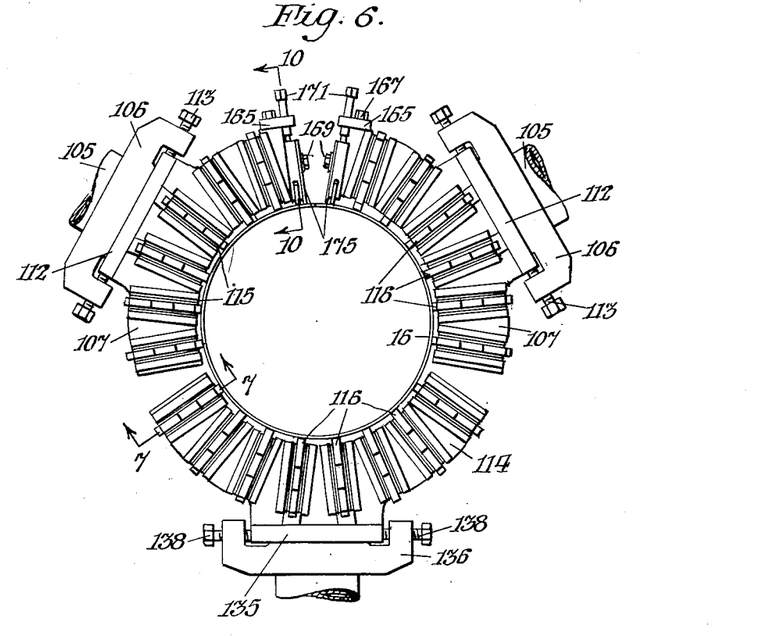
Fig. 6 is an enlarged fragmentary front elevation of the roller cage assembly and its supporting means indicated in Fig. 3.
Figure 7:
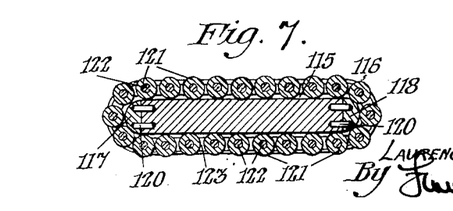
Fig. 7 is a sectional view of one of the cage roller elements, taken on the line 7—7 in Fig. 6.

As best shown in Figs. 3, 5, and 6; the lower segment 114 of the cage assembly is provided with a flat base portion 135 for mounting the lower segment 114 on its supporting bracket 136. Said segment 114 is rigidly connected to the supporting bracket 136 conveniently by means of the cap screws 137 which extend through openings in said bracket 136 into screw threaded openings formed in said base portion 135. Said bracket 136 is provided with a series of set screws 138 for maintaining said cage segment 114 in adjusted position on its supporting bracket 136.

The two upper segments 107 and the lower segment 114 form a substantially circular shaped roller cage assembly which has an effective internal diameter substantially equivalent to the outside diameter of the tubular shells to be welded in the apparatus. The segments 107 and 114 are readily removable from their supporting brackets, and may be interchanged for other roller element segments which form a larger or smaller effective diameter opening which will conform to the outside diameter, or perimeter, of the work pieces to be welded in the apparatus. Of course, the maximum and minimum limits on the sizes of the work pieces which may be welded in any particular size of apparatus embodying my invention is limited by the maximum and minimum range of adjustments which can be effected for the stud shafts 105 and piston 139 with their respective bracket supports and cage segments attached thereto. It also is to be noted that the work pieces must be supported at their perimeters at determinable minimum distances by a roller assembly in order to prevent the work piece from buckling between such roller assemblies under the closing pressure of the segments.

Said supporting bracket 136 is formed as the top closure of the fluid cylinder piston 139 which is slidably fitted in the cylinder 140 formed in the base section 141 of the U-shaped yoke 100. Said piston 139 is provided at its lowermost end with sealing means 142 for maintaining said piston 139 in slidable fluid tight relationship with the walls of its cylinder 140.

Said piston 139 is provided at its outer periphery with the external screw thread 143 which is in screw threaded engagement with the adjusting nut 145 by which said segment 114 of the cage assembly may be conveniently raised and lowered independently of the admission and exhaustion of fluid to the cylinder 140 in which said piston 139 is mounted. Said nut 145 is provided with a series of radial openings 146 adapted to have a rod inserted therein to facilely effect turning movement of the nut 145.

Said cylinder 140 is connected by the conduit 147 to a hydraulic booster for maintaining a yieldable constant pressure on the lower segment 114 of the cage assembly. Irregularities, for example, a waved seam edge, inevitably are present occasionally in preformed work pieces, particularly when the work pieces are formed from heavy gauge material such as steel plates. By maintaining a constant yieldable pressure, as distinguished from fixed or unyielding forces exerted by screw means, on the lower segment of the cage assembly, the lower segment in some measure can be said to "float" and is "free" to move a short distance up or down to compensate for irregularities existent in the portion of the work piece in the cage assembly. Although the lower segment 114 is free to "float," substantially the same constant pressure is continuously maintained on the work piece.

Figure 17:
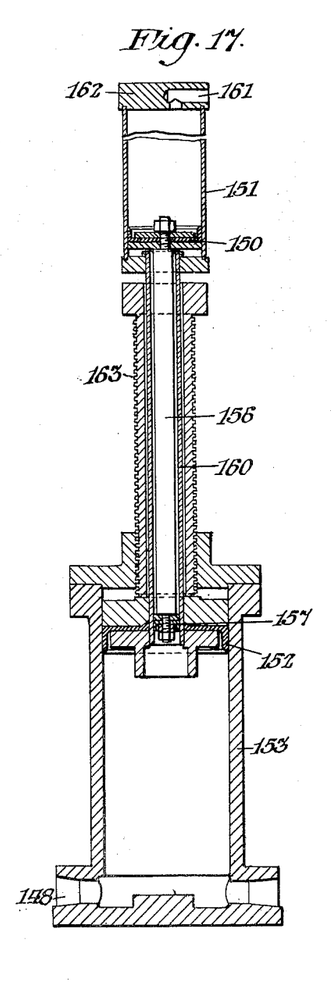
Fig. 17 is a vertical sectional view of the hydraulic booster cylinder used to effect movement of the lower segment of the roller cage assembly indicated in Fig. 6.

Although said booster means may be of any one of several types of construction, I have found it desirable to utilize a hydraulic cylinder of the type construction shown in Fig. 17, in which the outlet 148 of the hydraulic cylinder is adapted to be connected by the conduit 147 to the cylinder 140 formed in the base section 141 of the yoke 100. The hydraulic booster cylinder assembly shown in Fig. 17 includes a power air cylinder of well known construction comprising a piston 150 mounted in a cylindrical casing 151. The hydraulic cylinder is comprised of a piston 152 slidably mounted in its cylindrical casing 153. Said piston 150 is mounted on the upper end of the rod 156, and the lower end of said rod 156 has fixed thereon the small diameter piston 157 slidably mounted in its cylindrical housing 160. The cylinder 153, conduit 147, and the portion of the cylinder 140 beneath the lower end of the piston 139 are filled with fluid as a closed system. The piston 152 initially may be moved selectively in its cylinder 153 to effect an increased or decreased volumetric fluid capacity of the cylinder 153, and, hence, to effect raising or lowering of the piston 139 in its cylinder 140. Such movement is effected by the rotation of the hollow member 163 which is provided on its outer surface with a screw thread for engagement in the screw threaded opening of the top of the cylinder 153. The lower end of the hollow member 163 is connected to the follower member of the piston 152.

Air under pressure and under control of a valve of ordinary construction is admitted to the air cylinder 151 through a conduit connected to the inlet opening 161 conveniently formed in the top closure 162 of the air cylinder 151. Although different ratios are obtainable dependent upon the piston diameters used, in the structure shown in Fig. 17 the hydraulic pressure exerted through the booster cylinder will be approximately 9 times the air pressure. The ratio of the travel of the air cylinder piston 150 to the travel of the piston 139 may be expressed in terms of one inch travel of the air cylinder piston 150 equals .048 inch travel of the piston 139.

Referring more particularly to Figs. 8 to 11 inclusive, I find it desirable to provide separately adjustable means immediately adjacent the point of welding to assure that the edges of the seam of the tubular shells 16 will be maintained in desired position as the seam is presented at the welding point. As may be observed from Figs. 2 and 5, the construction of the apparatus is such that additional knurled rolls 60 with opposed backup rolls 57 could not be positioned at the point of welding because of the positioning of the welding means per se, backup shoe, etc.

Figure 10:
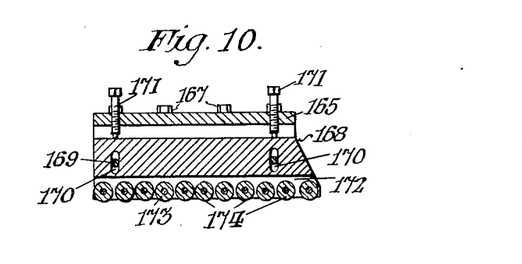
Fig. 10 is a sectional view of one of the flux trough hold-down roller elements indicated in Figs. 6 and 8, taken on the line 10—10 in Fig. 6.
Figure 11:
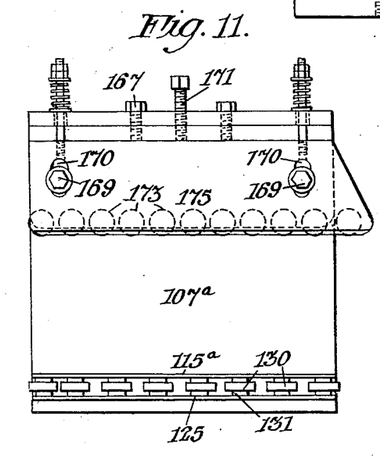
Fig. 11 is a left-hand elevation of the upper right segment of the roller cage assembly shown in Fig. 8, but with only the lowermost cage roller element shown for purposes of clarity.

Supporting brackets 165 are rigidly connected to the segments 107 (or 107ª as shown in Fig. 8) by means of cap screws 167. A hold down roller assembly 168 is slidably adjustably mounted on cap screws 169 which extend through elongated openings 170 formed in the body of said hold down roller assembly. Said supporting brackets 165 are provided with screw threaded openings in which the adjusting set screws 171 are in screw threaded engagement. As best shown in Fig. 10, the lower ends of said set screws 171 are adapted to bear against the upper surface of the hold down roller assembly. As best shown in Figs. 6 and 10; the bottom of said assembly 168 is provided with the bearing roll channel 172 in which is mounted a series of bearing rolls 173 on their respective shafts 174, the opposite ends of which are journalled in the bifurcations of the channel 172. When my apparatus is provided with welding means of the submerged arc type, I find it convenient to mount on the inner faces of said assemblies 168 the imperforate members 175 to thus form a flux trough. Said imperforate members 175 may be held in position by the cap screws 169 by which the hold down roller assemblies 168 are mounted on the segments 107 (or 107ª as shown in Fig. 8).

As may be observed from Fig. 5, the hold down roller assemblies 168 immediately adjacent the edges of the seam of the tubular shell, are longitudinally located with respect to the point of welding so that the arrays of bearing rollers 173 thereof extend for a substantial distance beyond the point of welding in the direction of travel of the tubular shell or pipe 16. As is commonly well-known to those skilled in the art, it is essential that the pipe be held firmly beyond the point of weld against any relative movement of the abutting seam edges until such a time as the weld has "frozen," or solidified. As is common knowledge to those skilled in the art, if such a welded pipe is not so held firmly and positively against movement for a sufficient distance beyond the weld point and until the weld has frozen, the contractions of the pipe at the vicinity of the weld upon cooling from the heat of weld may crack or weaken the weld, with the result that the pipe will not withstand required pressures.

Referring to Figs. 2, 5, 12, and 13; the welding backup shoe 180 is floatingly mounted in the mandrel 40 at the point of welding. As is commonly well-known to those skilled in the art, the function of a welding backup shoe is to prevent molten metal in the area around the weld point from falling to the mandrel or support means, and "freezing" the workpiece thereto; to limit the penetration, or the bead of the weld; and to cool the weld. As is further commonly well known to those skilled in the art, the point of welding customarily is located at a point no further forward than the approximate center of the welding backup shoe, so that the backup shoe will function as noted above. Said backup shoe 180 is maintained in adjustable spring pressed relation against the underside of the tubular shell 16 by means of springs 181, the upper ends of which bear against the underside of the backup shoe 180, and the lower ends of the springs 181 are in engagement with their respective adjustable supporting blocks 182. Said blocks 182 are slidably mounted in their respective bearing openings 183 formed in the members 185 rigidly mounted in the opening formed in the mandrel. Said spring supporting blocks 182 are slidably adjustable in their bearings 183 by means of set screws 186, the upper ends of which bear against the underside of the blocks 182. Said set screws 186 are mounted in screw threaded engagement in screw threaded openings formed at the bottom of members 185.

The shoe 180 is adapted to be cooled by means of cooling fluid circulated through the backup shoe 180 through the conduits 187 and 189 operatively connected in fluid tight relation to the opposite ends of the shoe 180. As best shown in Fig. 5, said conduits 187 and 189 extend through the longitudinal opening in the mandrel 40 to the entrance end of the apparatus, where the inlet conduit is connected to a suitable source of supply of cooling fluid and the discharge conduit is connected to a waste outlet.

I find it convenient to provide the mandrel 40 with the slidably adjustable backup members 190 which are positioned against the inner circumference of the tubular shell 16 in opposed relation to the series of bearing rolls 173 of the hold down roller assembly. I find it convenient to provide said adjustable backup members 190 with wear-resistant facings 191 formed of any of the well known wear-resistant materials. Said backup members 190 are slidably adjustable by means of the set screws 193 which are in screw threaded engagement in their lugs 195.

The apparatus is provided at the point of welding with an automatic welding head which may be mounted on the machine in any convenient manner such as on an L-shaped bracket carried by the mandrel assembly support means 41. Said welding head may be of any of the well known types, such as are manufactured and sold by nationally known manufacturers of welding equipment. As is well known in the art, a welding wire electrode is furnished on spools and such spools, indicated at 201, in Fig. 3, may be conveniently mounted on a supporting bracket 203 rigidly fixed to the top frame of the apparatus in any convenient manner. A welding wire electrode is fed automatically by the welding head, at a predetermined rate of speed to the point where the weld is to be made, as heretofore described with reference to the welding backup shoe, through a nozzle which is adjusted to proper position from the work with the welding wire electrode extending from the end of the nozzle to the work.

Although I have described above the use of welding means including an arc welding head and wire electrode, it is obvious that said work pieces may be welded by means of the use of any of the other well known types of welding apparatus, such as resistance welding apparatus, gas welding apparatus, etc.

Figure 12:
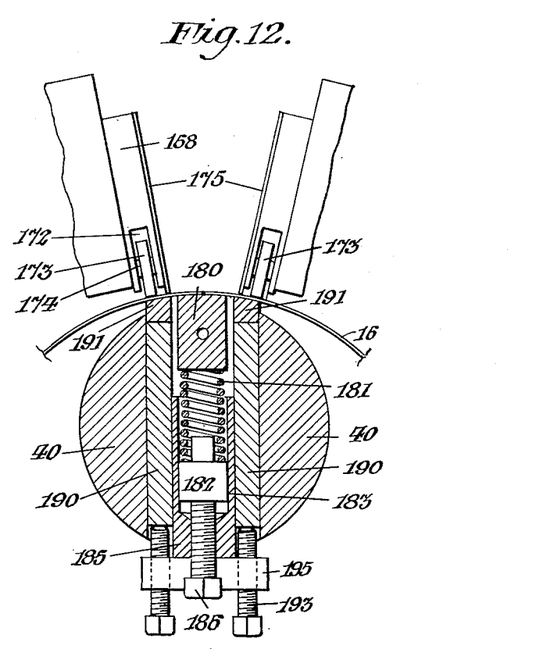
Fig. 12 is an enlarged fragmentary vertical sectional view taken on the line 12 in Fig. 5, but with the flux trough roller elements shown in elevation for purposes of clarity.
Figure 13:
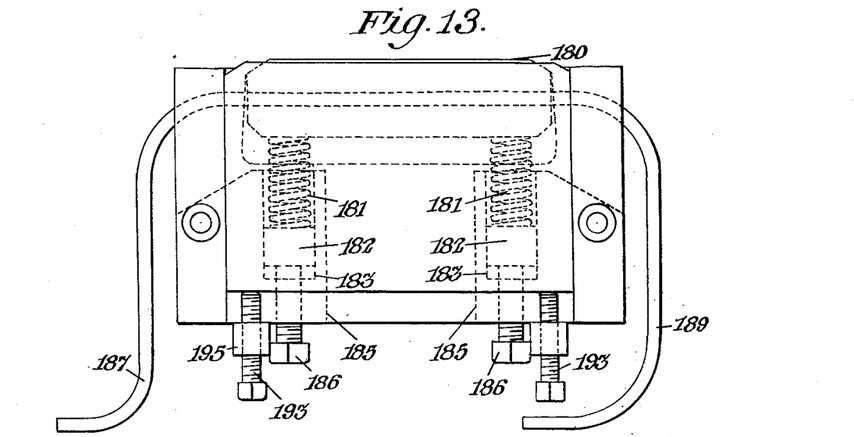
Fig. 13 is a left-hand side elevation of the welding backup shoe assembly indicated in Fig. 12.

Said automatic welding head is connected by suitable wiring to an operator's panel, indicated generally at 205, and to a control cabinet connected to a suitable source of electrical current of the proper voltage. If the welding apparatus is of the type using submerged arc process, the flux is maintained within the V-shaped flux trough formed by the imperforate members 175 connected to the inner faces of the assemblies 168. The flux is prevented from overrunning to the series of bearing rollers in the cage assembly by the imperforate members 175 which are in contact with the outer surface of the tubular shell 16, as is indicated in Fig. 12. Of course, flux recovery means of any of the well known types may be used in conjunction with the flux trough shown. It is to be understood that the welding means per se, wire electrode, insulating panel, etc., above described, form no part of my present invention.

Figures 20, 21, 22:
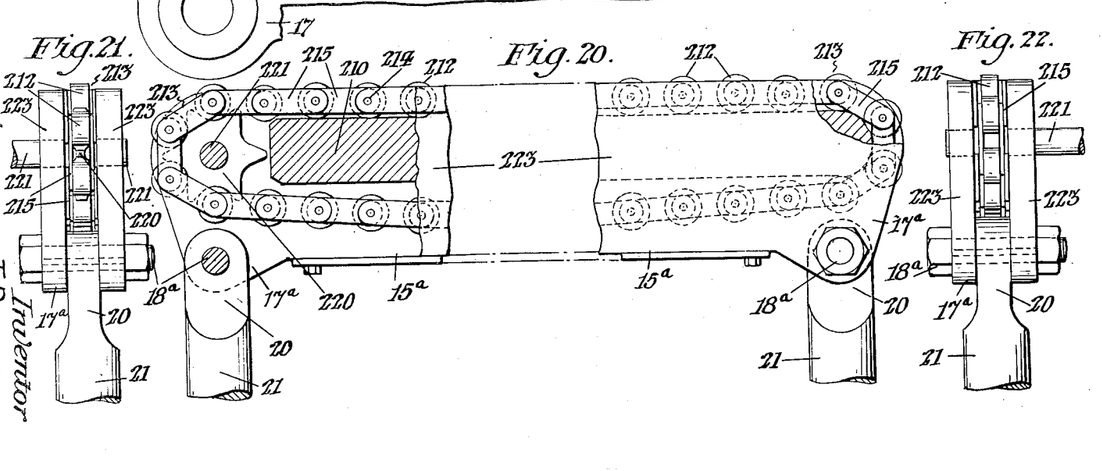
Fig. 20 is a fragmentary longitudinal vertical sectional view, partly in elevation, of a modified form of powered guide and support member which includes means, in lieu of the knurled drive rolls 60, backup rolls 57, etc. shown in Fig. 5, for moving work pieces through the apparatus.
Fig. 21 is a left-hand end elevation of the structure shown in Fig. 20.
Fig. 22 is a right-hand end elevation of the structure shown in Fig. 20.

In Figs. 20 to 22 inclusive I have shown a modified form of entrance guide and support members which include power driven means for moving work pieces through the apparatus. The support members shown in Figs. 20 to 22 inclusive includes a driven continuous bearing roller chain which not only guides and supports the work pieces but also moves the work pieces through the apparatus. Although the form of powered guide and drive members shown in Figs. 20 to 22 inclusive is particularly adaptable for use when my apparatus is used for the welding of short length work pieces, such members may also be used to move work pieces of any length through the apparatus.

When apparatus embodying my invention is constructed with powered support members of the construction shown in Figs. 20 to 22 inclusive, in lieu of support members of the construction as is shown in Fig. 5, it is not necessary to include in the apparatus the drive knurl rolls 60, backup rolls 57, etc. shown in the form of my invention disclosed in Figs. 1 to 5 inclusive.

Referring to Figs. 20 to 22 inclusive; the support members 15a are provided with bifurcated ends forming clevis means 17a, and the support members 15a are mounted by means of bolts 18a on the flattened eye ends 20 of their respective support studs 21, with the eye ends 20 projecting within said bifurcations in the same manner as has been heretofore described with reference to the support members 15. The members 15a are provided with a bearing roller support 210 which forms a support and track for the bearing rolls 212 of the continuous chain 213. The bearing rolls 212 are mounted on shafts 214, the opposite ends of which are connected by links 215 in the well known manner.

The continuous chain 213 is power driven conveniently by means of a sprocket gear 220 mounted on the shaft 221 which is journalled in the side members 223 of the guide support 15a. The shafts 221 of the respective sprocket gears 220 are arranged to be power driven by any convenient means. Of course, said support studs 21 are slidably adjustable in their respective bearing bosses in the same manner as heretofore described in the form of my invention wherein supports 15 are mounted on the eye ends 20 of said support studs.

*Operation*

My apparatus is not primarily a work piece forming apparatus and its function is to weld automatically the seams of preformed work pieces, such as tubular shells which have been preformed from flat material by rolling or pressing operations. Although my apparatus may be provided with welding means of any of the well known types, such as automatic electric arc welding means, resistance welding means, gas welding means, etc., the following is a description of the operation of an apparatus embodying my invention in which the longitudinal seams of the work pieces are welded by electric arc welding means.

A cage assembly comprising two upper segments 107 and a lower segment 114 having an effective internal diameter substantially equivalent to the outside diameter of the tubular shell when welded is installed on the respective segment brackets 106 and 136. The mandrel 40 is lowered by rotation of the shaft 52 to rotate the worm gear nuts 50 and 51 which effects simultaneous lowering of the shafts 42 and 43 connected to the mandrel support means 41, and the mandrel 40 connected thereto by means of the series of fins 56.

A preformed tubular shell 16 is fed into the apparatus at the entrance end, or the right-hand end of the apparatus as in Fig. 5. The four supporting members 15 are then adjusted by means of the screw means 25 at the yoke 3 so that the bearing rollers 27 of the members 15 lightly engage the periphery of the tubular shell 16. The support members 15 are so adjusted that the tubular shell is centrally located. The tubular shell 16 is then moved forward to the opposite ends of the support members 15 and the same adjustment is made by means of the screw means 25 at the yoke 5. The supports 15 should be so adjusted that the edges of the tubular shell are separated about a sixteenth to three thirty-seconds of an inch to assure that in operation of the apparatus there will be no excessive frictional wear on the fins 56. The support members 15 should be so adjusted that the correct gap in the open longitudinal seam of the tubular shell 16 is obtained and the tubular shell has assumed a substantially truly circular shape.

The mandrel 40 is then raised by reversely rotating the shaft 52 which effects a simultaneous raising of the shafts 42 and 43. The mandrel 40 is raised to a position wherein the tubular shell 16 is gripped at the opposite edges of the open longitudinal seam between the series of backup rolls 57 carried by the mandrel 40 and the series of opposed knurled drive rolls 60. As hereinbefore described, the springs 70 will hold the forward knurled drive rolls 60 in driving gripping contac twith the tubular shell positioned between the drive rolls 60 and their opposed backup rolls 57. Air under the desired pressure is admitted to the air cylinders 76 to maintain correspondingly the drive rolls 60 at the entrance end of the machine in driving gripping engagement with the edges of said tubular shell seam.

The circuit to the motor 80, operatively connected to the reduction gearing 86, is then closed which effects rotation of the series of drive gears 91 which will cause rotation of the knurled rollers 60 as the shafts 61 thereof are connected by universal coupling drive members 89 to the shafts 91 on which the drive gears 91 are fixedly mounted. The preformed shell 16 should be moved through the apparatus and stopped even with the forward end of the cage assembly. The backup shoe 180 should be manually depressed against the effective forces of its spring 181 to permit the advancing tubular shell 16 to ride over the top surface of the shoe, as otherwise the tubular shell 16 would abut against the raised side edge of the backup shoe 180.

The segments 107 of the cage assembly are then adjusted by means of their respective screw members 109. With the segments 107 properly adjusted, the segment 114 is then moved into engaging contact with the tubular shell 16. Initial movement of the segment 114 may be effected conveniently by rotation of the adjusting nut 145 in engagement with the screw thread 143 formed on the outer periphery of the piston 139, the top of which piston 139 forms the supporting bracket 136 for the segment 114.

Air under pressure is then admitted through the inlet 161 to the air cylinder 151, and the fluid under pressure in the cylinder 153, pipe 147, and cylinder 140 will force upwardly the piston 139 and segment 114 attached thereto. The pressure on the piston 139 should be so regulated as to maintain the longitudinal seam of the tubular shell 16 in closed position within the extended throat formed by the plurality of spaced assemblies of bearing means carried by the segments. The hydraulic booster cylinder 153 maintains the segment 114 at the desired constant pressure to assure proper shaping of the work piece and closure of the longitudinal seam thereof, and at the same time the booster cylinder 153 will allow the segment 114 to be free to "float" as irregularities appear in work pieces. By releasing the air from the air cylinder 151 thru its control valve, the lower segment 114 can be caused to drop a short distance, say ⅜ of an inch, from the work piece to permit ready removal of the work piece in the cage in the event the welding means, shoe, etc., become inoperative for any reason.

The segments should be adjusted so that the tubular shell 16 is positioned with the center of its longitudinal seam in a plane vertical to the axis of the mandrel. I find it desirable to pass two or three preformed shells 16 through the apparatus to observe that the foregoing condition remains constant.

Operation of the apparatus should be stopped when one tubular shell 16 is positioned within the extended throat of the cage assembly and with an abutting tubular shell positioned midway of the ends of the support members 15. When the apparatus is adjusted properly, the upper surfaces of both abutting shells should be even, or in line on their top surfaces. If the top surface of the tubular shell in the cage assembly is higher or lower than the top surface of the tubular shell in the support 15, compensating adjustment of the segments should be made to bring the two abutting tubular shells in line.

After the foregoing adjustments, if necessary, are made, the tubular shell 16 in the cage assembly should be run forward until it can be removed. The following tubular shell should be backed up, or moved to the right in Fig. 5, until the welding backup shoe 180 is exposed. The tubular shell 16 is then run forward again and the position of the welding backup shoe 180 should be observed to assure that the backup shoe 180 is in good contact with the inner surface of the tubular shell 16. The backup shoe 180 must be free to float and should be held against the tubular shell 16 with light pressure which may be adjusted by means of the set screws 186. The backup shoe 180 is not a forming device and its only function is to prevent molten metal from flowing through the mandrel when welding. Excessive pressure on the backup shoe 180 would result in excessive wear. The backup shoe 180 is cooled by fluid circulating from the pipe 187 through the backup shoe 180 to the discharge pipe 189 which is connected at its discharge end to a waste outlet. The discharge water temperature should not exceed approximately 180° Fahrenheit.

The hold down bearing means assemblies 168, connected to the inner faces of the segments 107, are adjusted by means of their respective set screws 171 so that the portion of the tubular shell immediately adjacent the longitudinal seam thereof is maintained in proper position and alignment to assure a proper weld. The backup members 190, carried by the mandrel 40, are adjusted by means of their respective set screws 193 to a position in which the wear resistant facings 191 of the backup members 190 are in supporting engaging contact at the inner periphery of the tubular shell 16 in opposed relation to the bearing rolls 173 of the hold down roller assembly 168.

Assuming that the submerged arc welding process is being used, the imperforate members 175, mounted on the inner faces of the assemblies 168, are adjusted to form a V-shaped flux trough to retain the surplus welding flux and prevent the welding flux from overrunning to the series of bearing rollers of the assemblies 168 and of the cage assembly. Suitable suction flux recovery means of any of the well known types may be used in conjunction with the flux trough.

When several tubular shells 16 have been passed through the apparatus and it has been observed that the conditions outlined above remain constant, the apparatus is ready to weld. Adjustment and operation of the automatic welding heads are well known to those skilled in the art and, accordingly, it is not deemed necessary to describe in detail the operations by which a welding wire electrode is fed automatically by a welding head, at a predetermined rate of speed to the point at which the weld is to be made, through a nozzle in proper adjusted position from the work piece with the welding wire electrode extending from the end of the nozzle to the work.

Tubular shells 16 are fed, manually or otherwise, continuously into the entrance end of the apparatus and are propelled along the mandrel in abutting relationship to the point of welding, and are thereafter discharged from the left-hand end of the cage assembly and mandrel, as in Fig. 1, as complete tubular shells having a welded longitudinal seam. The tubular shells 16 are maintained during their passage through the apparatus and at the point of welding in an abutting relationship by reason of the fact that one or more of the knurled drive rollers 60 at the entrance end of the apparatus are rotated at a slightly greatly R. P. M. than the remaining knurled drive rolls. If desired, an air cylinder feeding device, such as indicated at the upper right-hand side of Fig.

1, may be used to facilitate the loading of tubular shells into the entrance end of the apparatus.

If after welding a few tubular shells 16, it be found that the welded seam has a tendency to spiral, that is turn in a clockwise or counterclockwise direction, such condition may be corrected by angular adjustment of the lower segment 114. If it would be necessary to rotate the welded tubular shell 16 in a clockwise direction to bring its seam into alignment with that of the tubular shell entering the cage assembly, the lower segment 114 is adjusted angularly to the left, or in a clockwise direction. If it would be necessary to rotate the welded tubular shell 16 in a counterclockwise direction to bring its seam into alignment, the lower segment 114 is moved to the right, or in a counterclockwise direction. A slight adjustment of the segment 114 ordinarily will accomplish the desired result.

If one seam edge of the incoming tubular shells consistently is in advance of the other, compensating adjustments may be made on the guide supports 15 by a slight inward movement of the stud shaft 21 in the yoke 5 adjacent the leading side of the tubular shell. If such inward adjustment should close the seam gap to a point where the shell bears excessively against the fins 56, the opposite support 15 may be adjusted outwardly. If necessary, corresponding adjustments may be made at the entrance end of the apparatus.

When apparatus embodying my invention is provided with four powered guide and drive members 15ª, as shown in Figs. 20 to 22 inclusive, in lieu of the four supporting members 15 of a construction as shown in Fig. 5, the four supporting members 15ª are adjusted by means of the screw means 25 at the yokes 3 and 5 so that the bearing rolls 212 of the continuous chain 213 grippingly engage the periphery of the tubular shell 16. The support members 15ª are adjusted so that the tubular shell is centrally located. The power driven continuous chain 213 performs the function of moving the tubular shell 16 through the apparatus, and, hence, when my apparatus includes the form of power driven support and drive means 15ª, as shown in Figs. 20 to 22 inclusive, there is no need to include in the apparatus other work piece driving means, such as the knurled drive roll 60 etc., the functions of which have been heretofore described with reference to the form of my apparatus embodying supports 15.

I do not desire to limit myself to the specific details of construction, arrangement, or method of operation herein set forth, as it is obvious that various modifications may be made therein without departing from the essential features of my invention, as defined in the appended claims.

I claim:

1. In welding apparatus; the combination with a work piece supporting mandrel; of means for automatically feeding work pieces in abutting relationship along said mandrel and past means for welding the longitudinal seams of said work pieces; a cage assembly comprised of a plurality of separate segments encompassing said mandrel, with the point of weld within the limits of said cage assembly; means for separately supporting said segments; means for separately adjusting said segments toward and away from the perimeter of said work piece; a plurality of spaced assemblies comprised of a multiplicity of individual cylindrical bearing means carried by each segment, said bearing means assemblies forming an extended throat of an effective perimeter substantially equivalent to the desired outside perimeter of said work pieces when welded, and each of said individual cylindrical bearing means being of smaller diameter than said throat.

2. In welding apparatus; the combination with a work piece supporting mandrel; of means for automatically feeding work pieces in abutting relationship along said mandrel and past means for welding the longitudinal seams of said work pieces; a cage assembly comprised of a plurality of separate segments encompassing said mandrel, with the point of weld within the limits of said cage assembly; means for separately supporting said segments; means for separately adjusting said segments toward and away from the perimeter of said work piece; a series of spaced continuous track guideways in each of said segments; a continuous chain comprised of a multiplicity of individual cylindrical bearing rollers mounted to move in and around each guideway; said cylindrical bearing rollers forming an extended throat of an effective perimeter substantially equivalent to the desired outside perimeter of said work pieces when welded, and each of said cylindrical bearing rollers being of smaller diameter than said throat.

3. In welding apparatus; the combination with a work piece supporting mandrel; of means for automatically feeding work pieces in abutting relationship along said mandrel and past means for welding the longitudinal seams of said work pieces; a cage assembly comprised of a plurality of separate segments encompassing said mandrel, with the point of weld within the limits of said cage assembly; means for separately supporting said segments; means for separately adjusting said segments toward and away from the perimeter of said work piece; a series of spaced channelways at the inner surface of each segment; a multiplicity of individual cylindrical bearing means mounted in each channelway, each of said individual cylindrical bearing means being of smaller diameter than the opening through said cage assembly.

4. In longitudinal seam welding apparatus; the combination with a work piece supporting mandrel; of means for automatically feeding work pieces in abutting relationship along said mandrel and past means for welding the longitudinal seam of said work pieces, including a series of spaced backup rolls mounted in said mandrel and with the faces of said backup rolls extending slightly above the top surface of said mandrel; a series of drive rolls in opposed relation to said backup rolls; means for rotating said drive rolls; means for effecting gripping engagement of said work pieces between said backup rolls and said drive rolls; a cage assembly comprised of a plurality of separate segments encompassing said mandrel, with the point of weld within the limits of said cage assembly; means for separately supporting said segments; means for separately adjusting said segments toward and away from the perimeter of said work pieces; a plurality of spaced assemblies comprised of a multiplicity of individual cylindrical bearing means carried by each segment, said bearing means assemblies forming an extended throat of an effective perimeter substantially equivalent to the desired outside perimeter of said work piece when welded, and each of said individual cylindrical bearing means being of smaller diameter than the opening through said cage assembly.

5. In longitudinal seam welding apparatus; the combination with a work piece supporting mandrel; of means for automatically feeding work pieces in abutting relationship along said mandrel and past means for welding the longituidnal seam of said work pieces, including a series of spaced backup rolls mounted in said mandrel and with the faces of said backup rolls extending slightly above the top surface of said mandrel; a series of drive rolls in opposed relation to said backup rolls; means for rotating said drive rolls; means for effecting gripping engagement of said work pieces between said backup rolls and said drive rolls; a cage assembly comprised of a plurality of separate segments encompassing said mandrel, with the point of weld within the limits of said cage assembly; means for separately supporting said segments; means for separately adjusting said segments toward and away from the perimeter of said work piece; a series of spaced continuous track guideways in each of said segments; a continuous chain comprised of a multiplicity of individual cylindrical bearing rollers mounted to move in and around each guideway; said cylindrical bearing rollers forming an extended throat of an effective perimeter substantially equivalent to the desired outside perimeter of said work pieces when welded, and each of said individual cylindrical bearing rollers being of smaller diameter than the opening through said cage assembly.

6. In longitudinal seam welding apparatus; the combination with a work piece supporting mandrel; of means for automatically feeding work pieces in abutting relationship along said mandrel and past means for welding the longitudinal seam of said work pieces, including a series of spaced backup rolls mounted in said mandrel and with the faces of said backup rolls extending slightly above the top surface of said mandrel; a series of drive rolls in opposed relation to said backup rolls; means for rotating said drive rolls; means for effecting gripping engagement of said work pieces between said backup rolls and said drive rolls; a cage assembly comprised of a plurality of separate segments encompassing said mandrel, with the point of weld within the limits of said cage assembly; means for separately supporting said segments; means for separately adjusting said segments toward and away from the perimeter of said work piece; a series of spaced channelways at the inner surface of each segment; a multiplicity of individual cylindrical bearing means mounted in each channelway, each of said individual cylindrical bearing means being of smaller diameter than the opening througth said cage assembly; whereby, the inner crests of said multiplicity of individual cylindrical bearing means form an extended throat of an effective perimeter substantially equivalent to the desired outside perimeter of said work piece when welded.

7. In longitudinal seam welding apparatus; the combination with a work piece supporting mandrel; of means for automatically feeding work pieces in abutting relationship along said mandrel and past means for welding the longitudinal seam of said work pieces, including a series of spaced backup rolls mounted in said mandrel and with the faces of said backup rolls extending slightly above the top surface of said mandrel; a series of drive rolls in opposed relation to said backup rolls; means for rotating said drive rolls; means for effecting gripping engagement of said work pieces between said backup rolls and said drive rolls; a cage assembly comprised of a plurality of separate segments encompassing said mandrel, with the point of weld within the limits of said cage assembly; means for separately supporting said segments; means for separately adjusting said segments toward and away from the perimeter of said work pieces; a plurality of spaced assemblies comprised of a multiplicity of individual cylindrical bearing means carried by each segment, each of said individual cylindrical bearing means being of smaller diameter than the opening through said cage assembly, said bearing means assemblies forming an extended throat of an effective perimeter substantially equivalent to the desired outside perimeter of said work pieces when welded; and means including a double angular edge faced roll, for cold working the longitudinal seam edge of said work piece adjacent to the point of weld.

8. In pipe manufacturing apparatus wherein a seam is to be welded along an axial cleft in a pipe blank of large diameter, seam welding means adapted to weld the cleft as the pipe blank is advanced axially past said welding means, and chuck means for holding and guiding the pipe as it advances past the welding means, said chuck means including two coextensive sets of tandem rollers respectively disposed to engage the external surface of the advancing pipe blank, along the sides of the cleft therein, each set of rollers comprising a multiplicity of rollers having a diameter substantially smaller than the pipe blank and disposed in rolling engagement with the surface of the advancing pipe blank and arranged in a linear array close to the cleft in the blank and parallel thereto, the spacing between the rollers of each set being only slightly greater than the roller diameter, so that the blank is engaged at a multiplicity of closely spaced points by the rollers, the aforesaid welding means being disposed between the sets of rollers and each array of rollers extending for a distance along the path of the pipe blank which is greater than the diameter of the blank, a substantial part of the length of each array of rollers being disposed beyond the welding means in the direction of travel of the pipe blank, to hold the latter after the weld has been made, said chuck means also including a multiplicity of other sets of rollers engaging the external surface of the blank, said other sets of rollers being distributed circumferentially around the pipe blank, each of said other sets of rollers being substantially coextensive, longitudinally of the pipe path, with the two first mentioned sets of rollers, and each of said other sets of rollers comprising at least several rollers distributed along the pipe path, all of the rollers of said first two sets and said other sets being arranged to engage the pipe blank compressively to hold the cleft thereof tightly closed.

9. In pipe manufacturing apparatus wherein a seam is to be welded along an axial cleft in a pipe blank of large diameter, seam welding means adapted to weld the cleft as the pipe blank is advanced axially past said welding means, and chuck means for holding and guiding the pipe as it advances past the welding means, said chuck means including two coextensive sets of tandem rollers respectively disposed to engage the external surface of the advancing pipe blank, along the sides of the cleft therein, each set of rollers comprising a multiplicity of rollers having a diameter substantially smaller than the pipe blank and disposed in rolling engagement with the surface of the advancing pipe blank and arranged in a linear array close to the cleft in the blank and parallel thereto, the spacing between the rollers of each set being only slightly greater than the roller diameter, so that the blank is engaged at a multiplicity of closely spaced points by the rollers, the aforesaid welding means being disposed between the sets of rollers and each array of rollers extending for a distance along the path of the pipe blank which is substantially the diameter of the blank, a substantial part of the length of each array of rollers being disposed beyond the welding means in the direction of travel of the pipe blank, to hold the latter after the weld has been made, said chuck means also including a multiplicity of other sets of rollers engaging the external surface of the blank, said other sets of rollers being distributed circumferentially around the pipe blank, each of said other sets of rollers being substantially coextensive, longitudinally of the pipe path, with the two first-mentioned sets of rollers, and each of said other sets of rollers comprising at least several rollers distributed along the pipe path, all of the rollers of said first two sets and said other sets being arranged to engage the pipe blank compressively to hold the cleft thereof tightly closed.

10. In a chuck for receiving and holding a pipe blank having an axial cleft, during axial travel of said blank through said chuck, in combination, roller means disposed to engage the periphery of the pipe blank at circumferentially spaced localities, and a set of rollers disposed in linear array for engagement with the outer surface of the pipe along a region imediately adjacent and parallel to said cleft, a cage for holding said set of rollers and adjustable mounting means for said cage so that the set of rollers, independently of all other roller means, may be adjusted radially of the pipe blank, each of the rollers of said set having a shaft extending therethrough from the sides thereof and the cage for said set comprising bearing means respectively receiving the shafts of the rollers, the cage being disposed at one side of and in close proximity to the cleft in the pipe blank.

11. In apparatus for welding an axial cleft in a large diameter, generally cylindrical pipe blank, in combination, stationary welding means, means defining a path for said pipe blank including a chuck adapted to guide said pipe along a portion of the path adjacent said welding means with the axial cleft of the blank aligned with the welding means, said chuck comprising a multiplicity of rollers adapted to firmly, compressively and rollingly engage the margins of the blank closely adjacent the opposite sides of the cleft to hold it firmly closed, said rollers being distributed longitudinally substantial distances both in advance of and in the rear of said welding means, so that said cleft is held together firmly for a substantial distance before it reaches the welding means and for a substantial distance after it leaves the welding means, and driving means spaced longitudinally of said path, ahead of the chuck and adapted to engagingly drive both margins of the blank adjacent said cleft, so that both margins of the pipe are advanced concurrently through the chuck means, all of the rollers in said chuck means being independently journaled for free rotation therein, so that no driving force is applied to any part of the blank during its passage through the chuck.

12. In pipe manufacturing apparatus, in combination, means defining a path for longitudinal movement of a generally cylindrical pipe blank of large diameter and having a longitudinal cleft, means operable to advance a pipe blank along said path; submerged arc welding means positioned adjacent the path; a chuck adapted to guide the blank along a portion of said path adjacent the welding means with the sides of the celft firmly closed an with the cleft aligned with the welding means, said chuck comprising two sets of rollers, each set including a multiplicity of tandem rollers close to the opposite sides of the cleft edge, a pair of shield plates, one between each set of rollers and the cleft, means supporting the shield plates and limiting the movement of the shield plates, so that the shield plates confine the flux material inherent in use in submerged arc welding and keep said flux away from the rollers, but are not subject to deforming forces due to engagement with irregularities in the pipe blank.

13. In welding apparatus; the combination with a workpiece supporting mandrel; of means for automatically feeding workpieces in abutting relationship along said mandrel and past means for welding the longitudinal seams of said workpieces; a cage assembly comprised of a plurality of spaced assemblies encompassing said mandrel, with the point of weld within the limits of said cage assembly; each of said pluralities of spaced assemblies comprised of a multiplicity of individual cylindrical bearing means, said bearing means assemblies forming an extended throat of an effective perimeter substantially equivalent to the desired outside perimeter of said workpiece when welded, and each of said individual bearing means being of smaller diameter than said throat; means for separately supporting said spaced assemblies of said cage assembly; and means for separately adjusting a plurality of said spaced assemblies toward and away from the perimeter of said workpiece.

14. In welding apparatus; the combination with a workpiece supporting mandrel; of means for automatically feeding workpieces in abutting relationship along said mandrel and past means for welding the longitudinal seams of said workpieces; a cage assembly comprised of a plurality of spaced channelways at the inner surface of said cage assembly; a multiplicity of individual cylindrical bearing means mounted in each channelway, each of said individual cylindrical bearing means being of smaller diameter than the opening through said cage assembly; means for separately supporting said spaced channelways; and means for separately adjusting a plurality of said spaced channelways toward and away from the perimeter of the workpiece.

References Cited in the file of this patent
UNITED STATES PATENTS

| | | |
|---|---|---|
| 1,124,756 | Lloyd | Jan. 12, 1915 |
| 1,240,791 | Czajka | Sept. 18, 1917 |
| 1,850,176 | Lawson | Mar. 22, 1932 |
| 1,905,478 | Lutz | Apr. 25, 1933 |
| 1,933,133 | Anderson | Oct. 31, 1933 |
| 1,976,343 | Heineman | Oct. 9, 1934 |
| 1,980,164 | Boyle | Nov. 13, 1934 |
| 1,980,308 | Adams | Nov. 13, 1934 |
| 1,983,930 | Carlsen | Dec. 11, 1934 |
| 2,010,155 | Hull | Aug. 6, 1935 |
| 2,052,380 | Chapman | Aug. 25, 1936 |
| 2,060,561 | Fausset | Nov. 10, 1936 |
| 2,062,875 | Gardner | Dec. 1, 1936 |
| 2,065,461 | Johnston | Dec. 22, 1936 |
| 2,098,989 | Yoder | Nov. 16, 1937 |
| 2,139,771 | Riemanschneider | Dec. 13, 1938 |
| 2,150,202 | Blevins | Mar. 14, 1939 |
| 2,268,368 | Anderson | Dec. 30, 1941 |
| 2,417,594 | Fleche | Mar. 18, 1947 |
| 2,517,574 | Jones | Aug. 8, 1950 |
| 2,526,723 | Berkeley | Oct. 24, 1950 |
| 2,580,502 | Anderson | Jan. 1, 1952 |